United States Patent Office 3,220,968
Patented Nov. 30, 1965

3,220,968
STORABLE POLYCHLOROPRENE
POLYMER SOLUTION
Manfred Dollhausen, Hitdorf (Rhine), and Eugen Bock, Leverkusen, Germany, assignors to Farbenfabriken Bayer Aktiengesellschaft, Leverkusen, Germany, a German corporation
No Drawing. Filed Mar. 21, 1961, Ser. No. 97,134
Claims priority, application Germany, Mar. 30, 1960, F 30,872
13 Claims. (Cl. 260—31.2)

The present invention relates to storable chloroprene polymer solutions, which render possible the production of adhesive connections, of high heat strength, between various types of materials.

It has long been known to produce adhesive connections or joints and coatings with non-vulcanisable chloroprene polymer solutions. Adhesive joints and coatings of this type have satisfactory strength values at normal temperatures in the region of 20° C., but at higher temperatures, such as in the heat of summer, their strength value decreases considerably.

It is also known to add active vulcanisation accelerators as well as the usual constituents of the mixture to chloroprene polymer solutions. The heat strength which can be produced, as well as the other properties of an adhesive joint or a coating produced therewith are, however, greatly dependent on the nature of the added vulcanisation accelerator and the vulcanisation conditions which are observed.

For example, for the hot vulcanisation of chloroprene polymer, thiocarbanilide, p,p'-diamino-diphenylmethane, 2-mercaptoimidazoline or the o-toluylguanidine salt of the decatechol borate are used. However, these processes are complicated and can easily lead to damage to the material which is to be stuck or coated. They have therefore been little used in practice.

It has been usual instead to use poly-2-chlorobutadiene solutions with additives which render possible a vulcanisation at temperatures in the region of 20° C., in a sufficiently short time. Such chloroprene polymer solutions, which contain, for example, aliphatic amine compounds, have however the important disadvantage of having too little stability in storage. After the addition of the vulcanisation agent, their viscosity increases considerably after a short storage period and the solutions finally change into a gel, which is completely unsuitable for uniting or coating materials.

It has been proposed for these reasons to raise to a limited degree the viscosity stability of chloroprene polymer solutions containing an alkylene polyamine as vulcanising agent by adding other special amines, such as dibenzylamine, and carbon disulphide or their reaction products.

Unions or joints produced with these solutions are of adequate strength to resist a separation load for only a short time under heat, and they are completely destroyed under longer stressing. This corresponds to the experiences obtained with adhesive joints of plastic materials. These adhesive joints certainly withstand a short-lasting strength test under heat, but when used in practice, they frequently fail with substantially smaller loading. This observation is generally explained from the behaviour of the plastic materials. In the hot state and with rapid deformation speed, they show a comparatively high tensile strength, whereas with slow deformation speed a flowing occurs, and finally destruction is caused by considerably smaller forces by comparison.

Adhesive connections, which are not destroyed by a longer acting constant separation force under the action of heat, can be prepared from poly-2-chlorobutadiene solutions which contain 1,2-dihydroxybenzene and salicylic acid. Such chloroprene polymer solutions, however, in just the same way as those which contain only an alkylene polyamine show the serious disadvantage of changing into a gel after a short storage period and of thus becoming unsuitable for use.

Special chloroprene polymer solutions have now been discovered which do not show any of the disadvantages referred to above. The present invention provides solutions of homopolymers and/or copolymers of 2-chlorobutadiene in organic solvents, and containing (a) an aromatic hydroxy compound having at least two hydroxy groups, (b) an aliphatic polycarboxylic acid (i.e., containing at least two carboxyl groups) of saturated or unsaturated nature, the latter being capable of forming anhydride, or the anhydride of such an acid, and (c) zinc compounds. The above components also may consist of mixtures of several compounds according to the definition of said components.

Chloroprene polymer solutions according to the invention are almost completely stable, as regards viscosity at temperatures of 20° C., over very long periods of time, i.e., about six months. At higher temperatures, for example, in the region of about 50° C., storage times (viscosity stability) of at least four weeks can easily be produced. By solutions of "stable viscosity," as used herein there are to be understood solutions of chloroprene polymers which are brushable at room temperature. They permit adhesive joints to be produced at room temperature (i.e., temperatures between 15 to 25° C.) which joints withstand in excellent manner a long-lasting separation load at room temperature and also at substantially higher temperatures.

The term "chloroprene polymer" is used generally herein to include all commercial neoprenes. The term is used to include homopolymers of chloroprene as well as copolymers of chloroprene.

Various homopolymers, i.e., the polymers of 2-chlorobutadiene produced at varying high temperatures are suitable for the production of the chloroprene polymer solutions according to the invention. In principle, very different forms of chloroprene polymers are suitable, which polymers can be distinguished by their Defo values or Mooney viscosities on the one hand and their tendency to crystallisation on the other hand. Preferably rubbery polychloroprene polymers having a Defo hardness of about from 200 to 1200, corresponding to a Mooney viscosity of 30 up to 120, are employed.

Secondly, it is also possible to use copolymers of chloroprene, such as those formed by polymerisation of 2-chlorobutadiene with monomeric compounds which have one or more double bonds in their molecule, such as styrene, acrylic acid and functional derivatives thereof, acrylonitrile, vinyl chloride, vinylidene chloride, chlorotrifluorethylene and derivatives of these substances as well as other known monomers of the aliphatic and aromatic series of compounds; for example, a conjugated diene such as butadiene, 2-methylbutadiene, dichlorobutadiene and other known polymerisable dienes. Furthermore, it is also possible to use those polymers which are formed by replacement or conversion of functional groups of said the said polymers, for example by replacement of chlorine atoms with hydroxyl groups in polychlorobutadiene or by reduction of carboxyl groups to hydroxyl groups in copolymers.

Apart from the polymers of 2-chlorobutadiene, it is also possible to use mixtures of these polymers with natural rubber or various types of synthetic rubbers, for example chlorinated rubber or butadiene-acrylonitrile rubber. If mixtures of chloroprene polymers and synthetic or natural rubbers are used the proportion of synthetic or natural rubber preferably should not exceed 30 percent by weight calculated on the total amount of rubbery polymers as employed, although higher proportions of said natural or synthetic rubbers are not excluded.

For the production of the chloroprene polymer solutions according to the invention, aromatic hydroxy compounds with at least two hydroxy groups are used. Advantageously, there are used for this purpose mononuclear aromatic hydroxy compounds which contain at least two hydroxy groups in ortho position to one another, such as more especially pyrocatechol, pyrogallo, hydroxyhydroquinone or 4-tert.-butyl-1,2-dihydroxybenzene. In principle, it is also possible to employ hydroxy compounds of mononuclear or polynuclear aromatic substances having two or more ortho hydroxy groups, which groups can if necessary also carry other substituents.

These hydroxy compounds are used in quantities of 0.1–20% by weight, preferably 0.5–3% by weight, related to the chloroprene polymer content of the solutions.

The following are examples of saturated and unsaturated aliphatic polycarboxylic acids suitable for use in the present invention: aliphatic dicarboxylic acids, preferably those with 3–10 carbon atoms (such as malonic acid, succinic acid, glutaric acid and adipic acid); aliphatic polycarboxylic acids of unsaturated nature which are capable of anhydride formation, for example maleic acid, itaconic acid and citraconic acid. Further examples of aliphatic carboxylic acids are citric acid and tartaric acid. It is also possible to use anhydrides which can be formed from the aforementioned acids, as for example succinic acid anhydride.

According to a preferred embodiment of the present invention maleic anhydride is used.

The additions of polycarboxylic acids or the anhydrides thereof should exceed the quantity of hydroxy compounds in order to guarantee an excellent storage capacity of the solutions. Generally from 0.5 to 20% by weight calculated on the content of chloroprene polymer of the solution are used. Particularly good results can be produced with suitable small quantities of hydroxy compounds with 2 to 6% by weight, preferably 4% by weight, of polycarboxylic acid anhydride or the acid itself.

The polychloroprene polymer solutions according to the invention should also contain, as further component, a metal oxide and/or a metal salt of an inorganic or an organic acid in dispersed form, more especially a zinc compound. Examples of suitable zinc compounds which can be used for the present invention are zinc oxide as well as salts of zinc with inorganic acids, for example zinc chloride, zinc sulphate, zinc carbonate, or organic acids, for example, zinc acetate, formate, stearate or maleinate, said zinc salts being at least partially soluble in the polychloroprene polymer solution. In addition, it is also readily possible to employ salt-like compounds of zinc with organic hydroxy compounds, such as zinc salts of pyrocatechol, maleic acid and the like. Metal oxides or metal salts are necessary in quantities of 0.5 to 25% by weight, preferably 2 to 6% by weight.

Small amounts of aromatic monocarboxylic acids or dicarboxylic acids, such as, for example, benzoic acid, salicylic acid or phthalic acid or hydroxy benzoic acid, aliphatic or cycloaliphatic mono- or dicarboxylic acids, such as for example acetic acid, fumaric acid, endomethylene tetrahydro-phthalic acid as well as stearic acid as well as the salts of the latter can be added, but this is not necessary. The amount of monocarboxylic acid may not exceed the amount of dicarboxylic acid component according to this invention which is present in the mixture.

With reference to the aforementioned data concerning the quantities of the three components, it is also possible in principle to use larger proportions, but generally, this is scarcely necessary, since large amounts do not substantially improve the quality of the solutions.

According to another modification of the present invention, it is possible instead of, or jointly with, the hydroxy compounds defined above to use terpene-phenol resins, colophony-modified phenol-formaldehyde resins, alkyl-phenolformaldehyde resins or phenol-modified coumarone resins, in the production of which some of the phenols, in most cases up to 70 percent by weight, has been replaced by hydroxy compounds, such as tert. butylpyrocatechol, pyrocatechol or another of the hydroxy compounds defined above.

The preparation of the resins of this type which are not modified with pyrocatechol or other hydroxy compounds is described in "Lackkhunstharze," H. Wagner and H. F. Sarx, 4th edition, Carl-Hanser-Verlag, Munich, 1959, pages 54, 57, 136, 213, 238 and 239. These resins modified with polyhydroxy compounds, as explained above, can be used in such quantities that the proportion in the resin of the polyhydroxy compounds used according to the invention corresponds to the quantities which are employed when using the free hydroxy compounds.

The chloroprene polymer solutions according to the invention can be prepared in an extremely simple manner by dissolving or dispersing the chloroprene polymer, the constituents according to the invention, and the other constituents in a solvent while stirring, room temperature generally being suitable; higher temperatures up to, for example, the boiling temperature of the solvent or solvent mixture are, however, not excluded. In order to prepare solutions with good brushing qualities and with particularly high chloroprene polymer contents, it is necessary for the polymer to be sufficiently masticated on a roll stand before being dissolved. Some of the said substances, such as age resistors, as well as metal oxide or metal salts, carbon black or the like can be incorporated during this operation.

As solvents, it is possible to employ many of the solvents already used for similar purposes, i.e., solvents which are capable of dissolving chloroprene polymers. Examples of suitable solvents are aromatic hydrocarbons, such as benzene and its homologues (for example, toluene or xylene or mixtures thereof), cycloaliphatic hydrocarbons (such as cyclohexane), chlorinated hydrocarbons (such as chlorobenzene, trichlorethylene and ethylene dichloride), esters (such as methyl acetate, ethyl acetate or butyl acetate, as well as also those esters of higher organic acids and alcohols), ketones (such as methyl ethyl ketone and the like), and also mixtures of these solvents with one another. Aliphatic hydrocarbons, i.e., advantageously those with a carbon chain of 5 to 10 carbon atoms, are preferably employed in combination with one or more of the aforesaid solvents.

The concentration of the solutions according to the present invention may vary within wide limits depending on the particular field of application. Preferably solutions having a total content of from 5 to 50 percent by weight of chloroprene polymer are employed.

The materials to be united, if necessary in a roughened condition, are coated with the adhesive chloroprene polymer solution, exposed to air for a short time (i.e., generally 20 to 40 minutes) and thereafter are united with one another. It is advisable also to apply pressure to the composite elements. A union between the materials to be united is achieved at room temperature in this case, i.e., without any thermal treatment.

In addition to the constituents referred to above, the polychlorobutadiene solutions according to the invention can also contain known auxiliaries and fillers, such as tackifiers, acid acceptors, stabilisers, age resistors, reinforcing fillers and others. Mentioned as examples of these are natural or synthetic resins, carbon black silicates, phenols, amines and others.

The polychlorobutadiene solutions according to the present invention are suitable for the production of adhesive joints of high heat strength between many different types of materials, such as leather, natural or synthetic elastomers, wood, metals, glass, ceramic materials, paper, cardboard, synthetic resins, natural stone, concrete, textiles and also for uniting similar materials of the aforesaid types with one another. The polychlorobutadiene solutions can also be employed for the production of self-vulcanising layers, covering and coatings.

The polychlorobutadiene solutions according to the invention and also the adhesive joints produced therewith were subjected to the tests which are described below:

*Test for the storage capacity of the polychlorobutadiene solutions.*—The viscosities of the polychlorobutadiene solutions stored at 20° and 50° C., respectively, were measured, in centipoises with a viscometer, immediately after manufacture and after a storage period of 4 weeks.

*Test for the heat resistance of adhesive connections in the creep strength test.*—From sole rubber material with a thickness of 4 mm., strips with a length of 15 cm., and a width of 3 cm., were cut and roughened on one side. Pairs of these freshly roughened strips were coated with the polychlorobutadiene solution to be tested and, after exposure to air for 30 minutes, were united to form a test element according to DIN standard 53274. This test element is compressed for 24 hours and thereafter stored for 1 and 4 weeks, respectively, at 20° C. and 65% relative air humidity.

For testing purposes, the test element is introduced into a heating chamber heated to 50° C. The unstuck ends of the test element are bent over on both sides, one being fixed to a rail disposed inside the heating chamber and the other being provided with an arrangement permitting the attachment of weights. The adhesive connection is loaded with 2 kg. per cm. of width and the time interval is determined which is necessary in order completely to separate the adhesive connection at 50° C. If an adhesive connection withstands a separating load of 2 kg. per cm. of width for 3 hours at 50° C., it conforms substantially to practical requirements and is consequently referred to hereinafter as being undestructed (indicated by the sign "X"). A separation load of 2 kg. per cm. of width was chosen, since a higher loading usually causes destruction of the rubber material used for the test.

The parts referred to in the following examples are parts by weight unless otherwise mentioned.

The polychlorobutadiene solutions according to the invention generally (and depending on the solvent used), have a concentration which corresponds to a content of 3 to 50%, preferably 10 to 30% of chlorobutadiene homopolymer or copolymer.

TABLE I

|  | Known | Example 1 | 2 | 3 | 4 | 5 | 6 | 7 | 8 | 9 | 10 |
|---|---|---|---|---|---|---|---|---|---|---|---|
| Basic solution A, g | 400 | 400 | 400 | 400 | 400 | 400 | 400 | 400 | 400 | 400 | 400 |
| Carbon disulphite, g | 1.68 | | | | | | | | | | |
| Ethylene diamine, g | 0.44 | | | | | | | | | | |
| Dibenzylamine, g | 0.40 | | | | | | | | | | |
| Pyrocatechol, g | | 0.5 | 0.5 | 2.0 | 1.0 | 2.0 | 10.0 | | | | |
| O-Tert. butyl pyrocatechol, g | | | | | | | | 0.5 | 1 | 2 | 4 |
| Maleic acid anhydride, g | | 1.0 | 2.0 | 2.0 | 3.0 | 5.0 | 10.0 | 2.0 | 2.0 | 2.0 | 4 |
| Heat resistance of the adhesive connection tested in the creep strength test at 50° C. and 2 kg./cm. separation load after 28 days storage | 22 min. | X | X | X | X | X | X | X | X | X | X |
| Viscosity of the solution in cp., immediately after production | [1] 1,700 | 2,140 | 2,450 | 2,100 | 2,800 | 3,060 | 2,480 | 1,710 | 1,670 | 1,920 | 2,860 |
| after 28 days storage at 50° C. | | 3,560 | 2,900 | 3,000 | 2,800 | 3,890 | 5,200 | 2,280 | 2,360 | 1,950 | 2,650 |

[1] Jelly after 5 days.

X = Undestructed after 3 hours.

TABLE II

| Example | 11 | 12 | 13 | 14 | 15 | 16 | 17 | 18 | 19 |
|---|---|---|---|---|---|---|---|---|---|
| Basic solution A, g | 400 | 400 | 400 | 400 | 400 | 400 | 400 | 400 | 400 |
| Pyrocatechol, g | | 2 | 2 | 2 | 2 | 2 | 2 | | |
| Zinc salt of pyrocatechol, g | 3 | | | | | | | | |
| Pyrogallol, g | | | | | | | | 2 | |
| 4-cyclohexyl-1,2-dihydroxybenzene, g | | | | | | | | | 2 |
| Maleic acid anhydride, g | 2 | | | | | | | 2 | 2 |
| Maleic acid, g | | 2 | | | | | | | |
| Succinic acid, g | | | 2 | | | | | | |
| Succinic acid anhydride, g | | | | 2 | | | | | |
| Malonic acid, g | | | | | 2 | | | | |
| Adipic acid, g | | | | | | 2 | | | |
| Itaconic acid, g | | | | | | | 4 | | |
| Heat resistance of the connection tested in the creep strength test at 50° C. and 2 kg./cm. separation load after 28 days storage | X | X | X | X | X | X | X | X | X |
| Viscosity of the solution in cp. immediately after production | 2,280 | 2,050 | 2,050 | 2,350 | 2,780 | 2,280 | 3,420 | 2,550 | 2,000 |
| after 28 days storage at 50° C. | 2,300 | 3,100 | 3,100 | 3,450 | 3,840 | 2,700 | 3,760 | 3,400 | 2,400 |

X = Undestructed after 3 hours.

TABLE III

| Example | 20 | 21 | 22 | 23 | 24 | 25 | 26 | 27 | 28 | 29 |
|---|---|---|---|---|---|---|---|---|---|---|
| Basic solution A, g | 400 | 400 | 400 | 400 | 400 | 400 | 400 | 400 | 400 | 400 |
| Pyrocatechol, g | 0.5 | 0.5 | 0.5 | 0.5 | 0.5 | 0.5 | 0.5 | 0.5 | 2 | 2 |
| Maleic acid anhydride, g | 1 | 1 | 1 | 1 | 1 | 1 | 1 | 1 | 2 | 2 |
| Magnesium oxide, g | | | | | | 1 | 4 | 10 | | |
| Zinc oxide, g | 1 | 2 | 4 | 5 | 10 | 1 | 4 | 10 | | |
| Zinc carbonate | | | | | | | | | 6 | |
| Zinc acetate, g | | | | | | | | | | 4 |
| Heat resistance of the adhesive connection tested in the creep strength test at 50° C. and 2 kg./cm. separation load after 28 days storage | X | X | X | X | X | X | X | X | 28 min. | 37 min. |
| Viscosity of the solution in cp. immediately after production after 28 days storage at 50° C | 2,400 / 4,500 | 3,110 / 7,350 | 2,600 / 3,680 | 2,500 / 5,630 | 2,340 / 10,500 | 1,550 / 2,860 | 2,500 / 6,120 | 1,230 / 14,800 | 2,460 / 2,940 | 2,700 / 4,230 |

X = Undestructed after 3 hours.

TABLE IV

| Example | 30 | 31 | 32 | 33 | 34 | 35 | 36 | 37 |
|---|---|---|---|---|---|---|---|---|
| Pyrocatechol, g | 2 | | 2 | | 2 | | 2 | |
| p-Tert. pyrocatechol, g | | 2 | | 2 | | 2 | | 2 |
| Maleic acid anhydride, g | 2 | 2 | 2 | 2 | 2 | 2 | 2 | 2 |
| Milled sheet A, g | 100 | 100 | 100 | 100 | 100 | 100 | 100 | 100 |
| Methyl ethyl ketone, g | 335 | 335 | | | | | 170 | 170 |
| Toluene, g | | | 400 | 400 | | | | |
| Trichlorethylene, g | | | | | 670 | 670 | | |
| Cyclohexane, g | | | | | | | 170 | 170 |
| Heat resistance of the adhesive connection tested in the creep strength test at 50° C. and 2 kg./cm. separation load after 28 days storage | X | X | X | X | X | X | X | X |
| Viscosity of the solution in cp. immediately after production after 28 days storage at 50° C | 1,970 / 2,280 | 1,790 / 1,810 | 1,800 / 1,620 | 1,650 / 2,580 | 2,140 / 4,500 | 1,060 / 1,780 | 2,440 / 3,520 | 2,000 / 3,850 |

X = Undestructed after 3 hours.

TABLE V

| | Defo hardness about— | Example | | | | | | |
|---|---|---|---|---|---|---|---|---|
| | | 38 | 39 | 40 | 41 | 42 | 43 | 44 |
| | | G. | G. | G. | G. | G. | G. | G. |
| Pyrocatechol | | 0.5 | 0.5 | 0.5 | 0.5 | | 2 | 2 |
| p-Tert. pyrocatechol | | | | | | 2 | | |
| Maleic acid anhydride | | 2 | 1 | 1 | 1 | 2 | 2 | 2 |
| Basic solution A prepared from polychlorobutadiene | | 400 | 400 | 400 | 400 | 400 | 400 | 400 |
| Strong crystallisation tendency | 800 | | | | | | 64 | 90 |
| Strong crystallisation tendency (thiuram-modified) | 800 | 100 | | | | | | |
| Strong crystallisation tendency | 1,200 | | | 90 | | | | |
| Medium crystallisation tendency | 500 | | | | 110 | | | |
| Medium crystallisation tendency | 1,200 | | 90 | | | 90 | | |
| Slight crystallisation | 500 | | | | | | 120 | |
| Chlorinated natural rubber (about 67% chlorine content ac. to Parr) | | | | | | | 16 | |
| Acrylonitrile-butadiene rubber (about 28% acrylonitrile) | 1,800 | | | | | | | 10 |
| Heat resistance of the adhesive connection tested in the creep strength test at 50° C. and 2 kg./cm. separation load after 28 days storage | | X | X | 80 min. | X | 64 min. | 85 min. | X |
| Viscosity of the solution in cp. immediately after production after 28 days storage at 50° C | | 2,460 / 3,240 | 1,310 / 1,860 | 980 / 1,150 | 1,220 / 1,800 | 1,800 / 1,880 | 1,260 / 1,260 | 2,540 / 3,200 |

X = Undestructed after 3 hours.

TABLE VI

| Example | 45 | 46 | 47 | 48 | 49 | 50 | 51 | 52 | 53 |
|---|---|---|---|---|---|---|---|---|---|
| Basic solution A, g | 400 | 400 | 400 | 400 | 400 | 400 | 400 | 400 | 400 |
| Pyrocatechol, g | 2 | 2 | 2 | 2 | | 2 | | 2 | |
| p-Tert. butyl pyrocatechol, g | | | | | 2 | | 2 | | 2 |
| Maleic acid anhydride, g | 2 | 2 | 2 | 2 | 2 | 2 | 2 | 2 | 2 |
| Pentaerythritol ester of hydr. colophony, g | 20 | | | | | | | | |
| Pentaerythritol ester of maleic acid-modified colophony, g | | 10 | | | | | | | |
| Colophony-modified phenolformaldehyde resin, g | | | 10 | | | | | | |
| Terpene-phenol resin, g | | | | 40 | 40 | | | | |
| Coumarone resin, g | | | | | | 40 | 40 | | |
| Alkyl phenol-formaldehyde resin, g | | | | | | | | 10 | |
| Pyrocatechol-modified alkyl phenol-formaldehyde resin, g | | | | | | | | | 10 |
| Heat resistance of the adhesive connection tested in the creep strength test at 50° C. and 2 kg./cm. separation load after 28 days storage | X | X | X | X | X | X | X | X | X |
| Viscosity of the solution in cp. immediately after production after 28 days storage at 50° C | 2,120 / 2,560 | 2,150 / 2,860 | 2,360 / 2,810 | 1,800 / 1,970 | 1,390 / 1,950 | 1,800 / 2,220 | 1,630 / 1,800 | 2,450 / 4,130 | 2,370 / 5,450 |

X = Undestructed after 3 hours.

TABLE VII

| Example | 54 | 55 | 56 | 57 | 58 | 59 | 60 | 61 |
|---|---|---|---|---|---|---|---|---|
| Basic solution A, g | 400 | 400 | 400 | 400 | 400 | 400 | 400 | 400 |
| Pyrocatechol, g | 2 | 2 | 2 | 2 | 2 | 2 | 2 | 2 |
| Maleic acid anhydride, g | 2 | 2 | 2 | 2 | 2 | 2 | 2 | 2 |
| Pentaerythritol ester of maleic acid-modified colophony, g | | | | | | | 10 | |
| Coumarone resin, g | | | | | | | | 40 |
| Carbon black, g | 3 | | | | | | | |
| Silicic acid (precipitated from gas phase), g | | 5 | | | | | | |
| Silicic acid (precipitated from aqueous solution), g | | | 10 | | | | | |
| Chalk, g | | | | 10 | | | | |
| Kaolin, g | | | | | 10 | | | |
| Asbestos powder, g | | | | | | 10 | | |
| 2,2'-methylene-bis-(4-methyl-6-tert.-butyl phenol), g | | | | | | | 2 | 2 |
| Heat resistance of the adhesive connection tested in the creep strength test at 50° C. and 2 kg./cm. separation load after 28 days storage | X | X | X | X | X | X | X | X |
| Viscosity of the solution in cp. immediately after production after 28 days storage at 50° C | 1,870 / 2,840 | 1,550 / 2,620 | 1,040 / 2,610 | 1,060 / 1,300 | 910 / 1,870 | 1,020 / 1,840 | 2,120 / 2,850 | 1,630 / 1,750 |

X = Undestructed after 3 hours.

Examples

The prepare the polychlorobutadiene solutions according to the invention, homogeneous milled sheets were first prepared on a roller-mill of suitable size within 5 to 15 minutes.

A milled sheet A, from which a basic solution A was prepared, contained 4% of zinc oxide and 4% of magnesium oxide as well as polychlorobutadiene. A milled sheet B for the preparation of a basic solution B consisted only of polychlorobutadiene. If not otherwise indicated in the accompanying tables, polychlorobutadiene having a strong crystallisation tendency with a Defo hardness of about 800 was used for the preparation of the milled sheet.

The milled sheets were thereafter either dispersed in 320 parts by weight (based on the milled sheet of solvent mixture consisting of 40 parts by weight of ethyl acetate
40 parts by weight of benzene with the boiling point limits of 60 and 90° C.,
20 parts by weight of toluene, or (where other solvents or solvent mixtures have been indicated in the accompanying tables) homogeneously dispersed in the latter. The additives according to the invention and indicated in Tables I to VII were added to these basic solutions in the quantities indicated in such tables.

The storability of the solutions prepared in the manner described was tested and the heat resistance of the adhesive connections prepared with these solutions were determined in the creep strength test at 50° C., with a 2 kg./cm. separation load after 4 weeks.

Table I shows the clear superiority of the polychlorobutadiene solutions according to the invention (Examples 1 to 10), which contain maleic acid anhydride as the polycarboxylic acid and pyrocatechol or p-tert. butyl pyrocatechol as polyhydroxy compounds, as regards storability and heat resistance of the adhesive connections prepared with these solutions in comparison with a known vulcanising adhesive based on polychlorobutadiene.

The Examples 11 to 19 (Table II) contain the test results which can be produced when using other polyhydroxy compounds or the zinc salt of pyrocatechol and polycarboxylic acid and/or polycarboxylic acid anhydrides.

Table III contains Examples 20 to 29, in which polychlorobutadiene solutions according to the invention are used and containing varying quantities of zinc oxide (perhaps jointly with magnesium oxide) or another zinc compound.

For the preparation of the polychlorobutadiene solutions indicated in Table IV, other solvents or solvent mixtures were employed instead of the otherwise used solvent mixtures consisting of ethyl acetate, benzine and toluene.

For Examples 38 to 44 (Table V), there were used polychlorobutadiene solutions which were prepared from polymers of polychlorobutadiene which differ in the nature in which the polymerisation is conducted, perhaps blended with other types of rubber.

Tables VI and VIII (Examples 45 to 61) contain the test results of adhesives which include other additives, more especially resins, as well as the additives according to the invention.

The following are mentioned as examples of the resin components usually employed:

(1) A pentaerythritol ester of hydrogenated colophony, e.g., Pentalyn H with the softening point 105° C. (determined by the "Hercules Dropping Method").

(2) A pentaerythritol ester of colophony modified with maleic acid (Pentalyn K) with the softening point 190° C. (determined by the "Hercules Dropping Method").

(3) A colophony-modified phenol-formaldehyde resin (Beckacite 130) with the softening range 120 to 130° C. (determined by the capillary method).

(4) A terpene-phenol resin (Superbeckacite 2000) with the softening point 60–70° C. (determined by the capillary method).

(5) A coumarone-indene resin (Kumaronharz B3/135) with the softening point 135° C. (determined according to Krämer-Sarnow).

(6) An alkyl phenol-formaldehyde resin (SP 126 resin) with the softening point 60 to 75° C. (determined by the capillary method).

The production of the resins mentioned under 1–6 is described in "Lackkunstharze," Hans Wagner and Hans Friedrich Sarx, 4th addition, Carl-Hauser-Verlag, Munich, 1959, pages 54, 57, 136, 238 and 239.

(7) A pyrocatechol-modified alkyl phenol-formaldehyde resin of the softening point 70° C. to 75° C. (capillary method) prepared by heating 1 mol of p-tert. butyl phenol, 1 mol of formaldehyde (as 40% aqueous solution) and 0.5 mol of p-tert. butyl pyrocatechol for 4 hours with 2.5 g. of concentrated hydrochloric acid. The condensation product was dissolved in benzene, this solution was neutralised with sodium bicarbonate, washed with water and dried over sodium sulphate. The solvent was removed from the reaction product by evaporation at 20° C.

For the production of the polychloroprene solution according to the invention used in Example 55, a silicic acid precipitated from the gas phase (Aerosil Standard) was employed, while in Example 56, Vulcasil C was used as silicic acid product and 2,2'-methylene-bis-(4-methyl-6-tert.butyl-phenol) was used as the age resister in Example 61.

What we claim is:

1. A storable solution of a rubbery chloroprene polymer in an organic solvent, which solution is suitable for the production of adhesive connections and coatings which consist essentially of a rubbery chloroprene polymer and (1) 0.1–20% by weight of an aromatic hydroxy compound selected from the group consisting of (a) a mononuclear aromatic polyhydroxy alcohol containing a maximum of three hydroxy groups, two of which are in ortho position one to the other, (b) one of said mononuclear aromatic polyhydroxy alcohols which is substituted with an aliphatic radical containing up to 4 carbon atoms, and (c) an alkylphenol-formaldehyde resin modified with said mononuclear aromatic polyhydroxy alcohol, (2) 0.5–20% by weight of a member selected from the group consisting of an aliphatic carboxylic acid containing a maximum of three carboxyl groups and from 3 to 10 carbon atoms, and an anhydride of said carboxylic acid, and (3) 0.5–25% by weight of a zinc compound selected from the group consisting of a zinc salt and zinc oxide, said percentages being based on the chloroprene polymer content of said solution.

2. The storable chloroprene polymer solution of claim 1, wherein said rubbery chloroprene polymer is a homopolymer of 2-chlorobutadiene, having a Defo hardness from 200 to 1200.

3. The storable chloroprene polymer solution of claim 1, wherein said aromatic hydroxy compound has two hydroxy groups in ortho position to one another.

4. The storable chloroprene polymer solution of claim 1, wherein said aliphatic carboxylic acid is a saturated aliphatic dicarboxylic acid having from 3 to 10 carbon atoms.

5. The storable chloroprene polymer solution of claim 1, wherein said aliphatic carboxylic acid is an unsaturated aliphatic dicarboxylic acid capable of anhydride formation.

6. The storable chloroprene polymer solution of claim 1, wherein said aromatic hydroxy compound is at least partially substituted by a modified phenolic resin, said phenolic resin being modified by substituting at least a part of the amount of phenol which is used in preparation of the resin by an aromatic hydroxy compound as defined in claim 1, and wherein said modified phenolic resin is employed in sufficient amount that the proportion in the resin of the aromatic hydroxy compound used corresponds to the quantity which is employed when using the free hydroxy compound.

7. Storable solutions of rubbery chloroprene polymers in organic solvents suitable for the production of adhesive connections and coatings, said solutions consisting essentially of a rubbery chloroprene polymer and (1) 2–6% by weight, based on the chloroprene polymer, of a member selected from the group consisting of an aliphatic carboxylic acid containing a maximum of three carboxyl groups and from 3 to 10 carbon atoms, and an anhydride of said carboxylic acid, (2) an aromatic hydroxy compound selected from the group consisting of (a) a mononuclear aromatic polyhydroxy alcohol containing a maximum of three hydroxy groups, two of which are in ortho position one to the other, (b) one of said mononuclear aromatic polyhydroxy alcohols which is substituted with an aliphatic radical containing up to 4 carbon atoms, and (c) an alkylphenol-formaldehyde resin modified with said mononuclear aromatic polyhydroxy alcohol, said aromatic hydroxy compound being present in an amount of at least 0.1% by weight, based on the weight of the chloroprene polymer, but in an amount smaller than that of (1), and (3) 0.5–25% by weight, based on the weight of the chloroprene polymer, of a zinc compound which is at least partially soluble in said chloroprene polymer solution.

8. Storable solutions of rubbery chloroprene polymers in organic solvents suitable for the production of adhesive connections and coatings, said solutions consisting essentially of a rubbery chloroprene polymer and (1) 0.5–3% by weight, based on the weight of the chloroprene polymer, of an aromatic hydroxy compound selected from the group consisting of (a) a mononuclear aromatic polyhydroxy alcohol containing a maximum of three hydroxy groups, two of which are in ortho position one to the other, (b) one of said mononuclear aromatic polyhydroxy alcohols which is substituted with an aliphatic radical containing up to 4 carbon atoms, and (c) an alkylphenol-formaldehyde resin modified with said mononuclear aromatic polyhydroxy alcohol, (2) 2–6% of maleic anhydride, based on the weight of the chloroprene polymer, and (3) 0.5–25% by weight of a zinc compound which is at least partially soluble in said chloroprene polymer solutions.

9. The polymer solution of claim 8 wherein said aromatic hydroxy compound is pyrocatechol.

10. The polymer solution of claim 8 wherein said aromatic hydroxy compound is 4-t-butyl-1,2-dihydroxy-benzene.

11. Storable solutions of rubbery chloroprene polymers in organic solvents suitable for the production of adhesive connections and coatings, said solution consisting essentially of a rubbery chloroprene polymer and (1) 0.5–3% by weight, based on the weight of the chloroprene polymer, of an aromatic hydroxy compound selected from the group consisting of (a) a mononuclear aromatic polyhydroxy alcohol containing a maximum of three hydroxy groups, two of which are in ortho position one to the other, (b) one of said mononuclear aromatic polyhydroxy alcohols which is substituted with an aliphatic radical containing up to 4 carbon atoms, and (c) an alkylphenol-formaldehyde resin modified with said mononuclear aromatic polyhydroxy alcohol, (2) 2–6% of maleic anhydride, based on the weight of the chloroprene polymer, and (3) 0.5–25% by weight, based on the weight of the chloroprene polymer, of zinc oxide.

12. The polymer solution of claim 11 wherein component (1) is a mononuclear aromatic polyhydroxy alcohol containing two hydroxyl groups in ortho position to each other.

13. In a process for bonding two materials together by coating the two materials to be united with an adhesive chloroprene polymer solution, exposing them to the air for a short time, and pressing them together, the improvement comprising using as the adhesive chloroprene solution an organic solvent solution of a rubbery chloroprene polymer, which solution further contains (1) 0.1–20% by weight of an aromatic hydroxy compound selected from the group consisting of (a) a mononuclear aromatic polyhydroxy alcohol containing a maximum of three hydroxy groups, two of which are in ortho position one to the other, (b) one of said mononuclear aromatic polyhydroxy alcohols which is substituted with an aliphatic radical containing up to 4 carbon atoms, and (c) an alkylphenol-formaldehyde resin modified with said mononuclear aromatic polyhydroxy alcohol, (2) 0.5–20% by weight of a member selected from the group consisting of an aliphatic carboxylic acid containing a maximum of three carboxyl groups and from 3 to 10 carbon atoms, and an anhydride of said carboxylic acid, and (3) 0.5–25% by weight of a zinc compound which is at least partially soluble in said chloroprene polymer solution.

References Cited by the Examiner

UNITED STATES PATENTS

| | | | |
|---|---|---|---|
| 2,343,558 | 3/1944 | Kirby et al. | 260—31.8 |
| 2,482,293 | 9/1949 | Saunders | 260—45.75 |
| 2,537,646 | 1/1951 | Behrend | 260—45.85 |
| 2,664,413 | 12/1953 | Parker | 260—45.85 |
| 2,876,210 | 3/1959 | Wynn et al. | 260—45.95 |
| 3,027,351 | 3/1962 | Lichty | 260—45.85 |

MORRIS LIEBMAN, *Primary Examiner.*

LEON J. BERCOVITZ, ALEXANDER H. BRODMERKEL, *Examiners.*